(No Model.)
F. W. OLDS.
STEAM HEATER.
No. 540,870. Patented June 11, 1895.
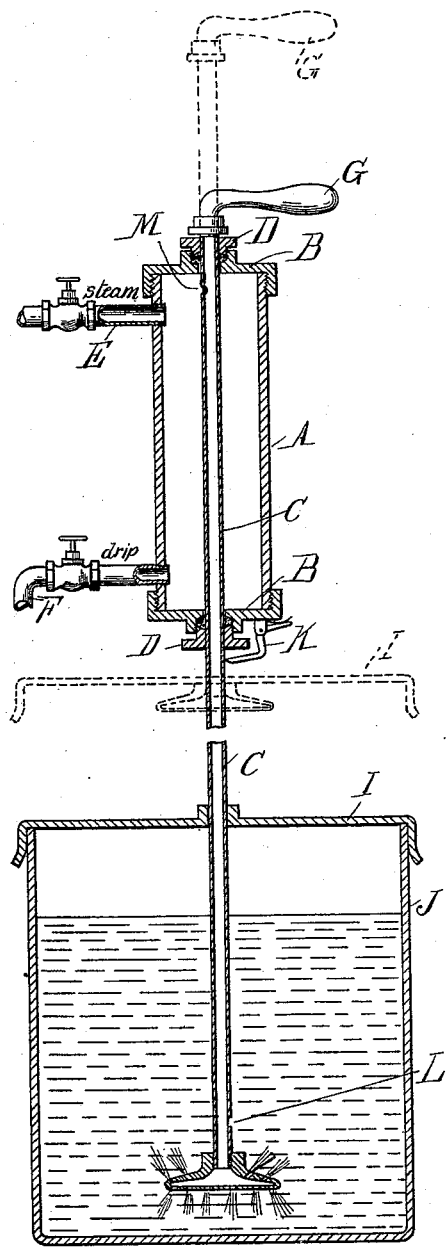
Witnesses:
O. F. Barthet,
L. J. Whittemore
Inventor:
Frank W. Olds,
By Mo. S. Sprague & Co.
Attorneys.

UNITED STATES PATENT OFFICE.

FRANK W. OLDS, OF DETROIT, MICHIGAN.

STEAM-HEATER.

SPECIFICATION forming part of Letters Patent No. 540,870, dated June 11, 1895.

Application filed March 5, 1895. Serial No. 540,600. (No model.)

*To all whom it may concern:*

Be it known that I, FRANK W. OLDS, a citizen of the United States, residing at Detroit, in the county of Wayne and State of Michigan, have invented certain new and useful Improvements in Steam-Heaters, of which the following is a specification, reference being had therein to the accompanying drawing.

The invention consists in the construction of a heating device for starch, &c., in which the starch is heated by steam injected directly into the same in a receptacle. The construction embodies a steam chamber having steam inlet and drip pipes, a sliding steam discharge pipe adapted to be connected and disconnected with the steam chamber, and a discharge nozzle on the end thereof to enter the receptacle containing the matter to be heated and further in the construction, arrangement and combination of the various parts.

In the drawing is shown a vertical central section through my improved device, showing in full and dotted lines the different positions of the parts.

A is a casing, preferably cylindrical, having the heads B through which slidingly engages the tube C, a tight joint around the tube being obtained by means of suitable packing nuts D.

E is a valve controlled steam inlet pipe leading into the upper part of the chamber and F is a drip pipe from near the lower end thereof.

I is a diaphragm or plate sliding on the tube above the lower end thereof and adapted to act as a cover for the pail or receptacle J.

K is a latch or hook adapted to engage with the detent L on the steam tube.

M is a port or aperture near the upper end of the tube to allow the steam in the chamber A to pass into the tube C.

The parts being thus constructed their operation is as follows: When the device is not in use the operator draws up on the handle G and thereby draws the port M through the stuffing box to the outside of the chamber, leaving only an imperforate portion of the tube C within that chamber. The parts are thus held in this position, as shown in dotted lines in the drawing, by means of the catch K. When it is desired to operate the device, steam being turned on, the drip pipe being open, the receptacle J is placed beneath the chamber and the operator taking hold of the handle G pushes it down into the receptacle, which will be closed by the plate or cover I. As the tube reaches the lower end of its movement the port M will be uncovered and allow the steam from the chamber A to pass through the tube and out through the nozzle and thus heat the material therein.

The lower end of the tube C may be perforated without using the special distributing nozzle and effect the same result.

This construction is one which in use is satisfactory, which is simple in construction and cheaply manufactured. It is especially useful in laundries and other places where starch or water is to be heated quickly.

What I claim as my invention is—

1. A steam heater comprising a steam chamber provided with steam inlet and drip pipes, a steam discharge pipe having a port and slidingly engaging through, and adapted to be connected and disconnected with said steam chamber, and a discharge nozzle at the end of the pipe adapted to enter a receptacle containing the matter to be heated.

2. In a steam heater, the combination with a steam chamber provided with steam inlet, and drip pipes, a steam discharge pipe slidingly engaging through the ends of said chamber, a port near the upper end thereof, a receptacle into which the lower end of said pipe extends and a receptacle cover sliding on the pipe, substantially as described.

3. In a steam heater, the combination with a steam chamber, a steam discharge pipe slidingly extending therethrough, a handle at the upper end of said pipe, an aperture therein below the handle, a detent L on the pipe near the cover, and a catch on the steam chamber adapted to engage with the detent or shoulder when the receptacle is opened, substantially as and for the purpose described.

In testimony whereof I affix my signature in presence of two witnesses.

FRANK W. OLDS.

Witnesses:
L. J. WHITTEMORE,
M. B. O'DOGHERTY.